2 Sheets—Sheet 1.
J. S. DETWILER.
FLOUR-BOLTS.
No. 193,933. Patented Aug. 7, 1877.
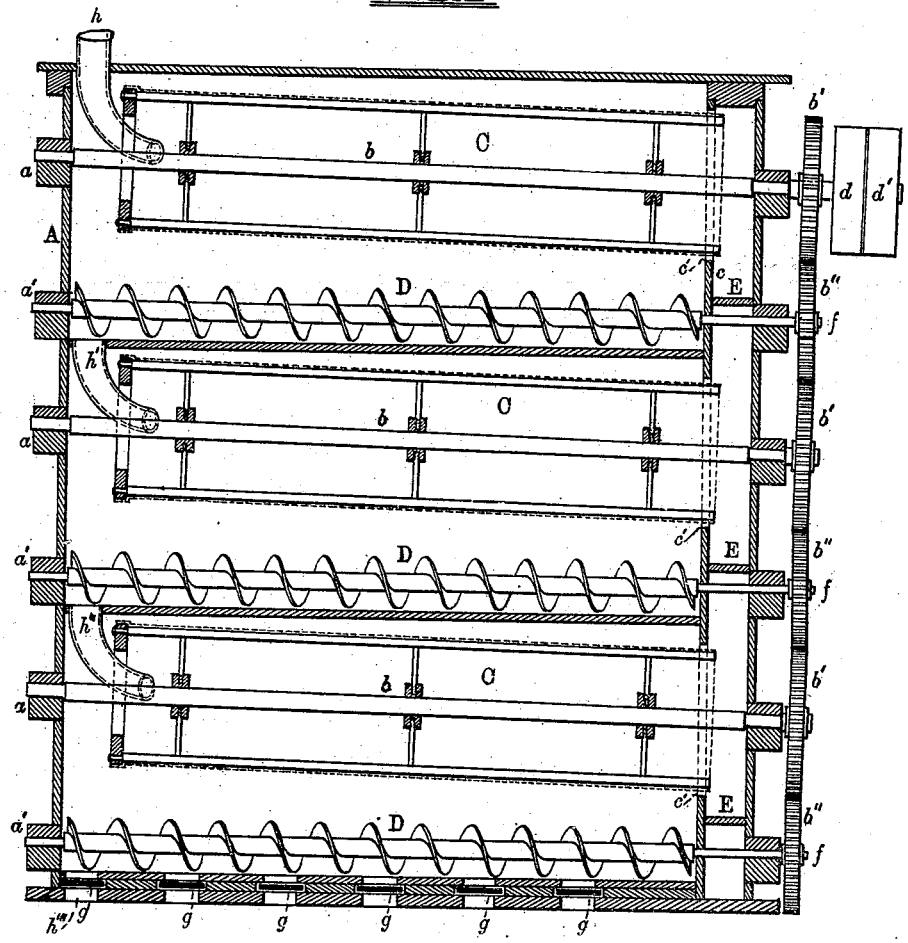
FIG. I.
WITNESSES
INVENTOR 2 Sheets—Sheet 2.
J. S. DETWILER.
FLOUR-BOLTS.
No. 193,933. Patented Aug. 7, 1877.
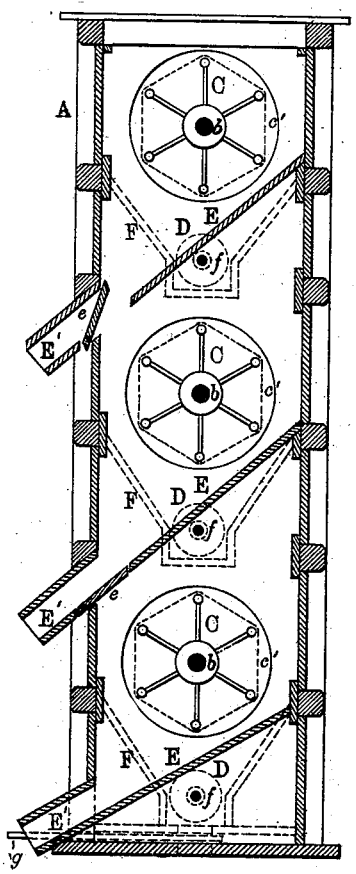
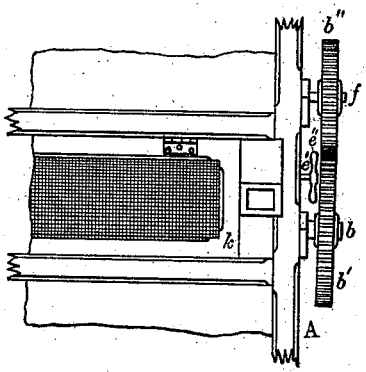
WITNESSES
INVENTOR

UNITED STATES PATENT OFFICE.

JOHN S. DETWILER, OF PHILADELPHIA, PENNSYLVANIA.

IMPROVEMENT IN FLOUR-BOLTS.

Specification forming part of Letters Patent No. 193,933, dated August 7, 1877; application filed April 19, 1877.

*To all whom it may concern:*

Be it known that I, JOHN S. DETWILER, of 1015 N. Delaware avenue, Philadelphia, Pennsylvania, have invented a certain Improved Apparatus for Bolting and Rebolting Flour, of which the following is a specification; and I do hereby declare that in the same is contained a full, clear, and exact description of my said invention, reference being had to the accompanying drawing and to the letters of reference marked thereon.

My invention relates to a new and improved machine for bolting and rebolting flour, which combines in one chest or apparatus a series of bolting-reels, the united capacity of which, both as to length and circumference, is sufficient to bolt the flour and rebolt the same, so as to produce an article superior to that treated in the ordinary way, and with greater economy both as to yield and time. In connection with the said series of reels, I employ a series of screw-conveyers, each of which, running in a direction opposite to the course taken by the ground grain, &c., in descending the inclined reels, conveys the partly-bolted flour to the higher end of the next lower reel, which, in turn, empties so much of its contents as is to be again bolted to the next lower conveyer, which carries the same to the higher end of the succeeding reel. Another feature of my invention enables the attendant to spout off the bran or middlings separately from each reel, or to collect the offal, coarse and fine, at the ultimate end of the machine, and spout it off therefrom. Different grades of middlings, when the devices for producing the separate disposition thereof are employed, are thus obtainable, the coarsest particles being discharged from the upper spout, the next finer from the next succeeding spout, and so on to the end of the process of bolting. The middlings are discharged from the reels at the end thereof opposite to that at which the flour is received into the reels, and no accidental mixture of the two articles can occur.

Due regard is had to the proper ventilation and cooling of the apparatus by the employment of ventilating-panels, which are hinged to the frame of the chest, so that on raising the panels the interior of the machine is readily accessible.

In the accompanying drawing forming a part of this specification, Figure 1 is a vertical longitudinal section of a machine embracing my invention. Fig. 2 is a vertical transverse section of the same. Fig. 3 is a front view of a portion of the invention.

Similar letters of reference indicate similar parts of the invention in all the views.

A is the frame-work of the chest, having bearings $a$ for the reel-shafts $b$. The reel-shafts are slightly inclined toward the driving-end of the machine, as shown, and carry reels C, which, in actual use, are about twenty feet in length and forty-two inches in diameter. The lower ends of the reels pass through and extend slightly beyond a partition, $c$, running the entire height of the machine, the ends of the reels passing through circular openings $c'$, provided for the purpose. The upper reel-shaft is provided with tight and loose pulleys $d$ $d'$. D D D are screw-conveyers on horizontal shafts $f$, supported in bearings $a'$. E E E are inclined bottoms or chutes, placed between the outer frame A and the partition $c$. Parts of the bottom or chutes E are detached therefrom and serve as valves $e$, working on pins $e'$ connecting with handles $e''$, extending from the side of the chest. Each valve $e$, when opened, as shown in the representation of the upper valve in Fig. 2, shuts off communication between its chute E and the corresponding spout E', and the middlings, falling from the end of the reel over the partition $c$, pass to the chute next below; but when the valve is closed, as shown below, it forms a part of the bottom or chute, and the middlings fall from the adjoining spout from the machine.

The reel-shafts $b$ are provided with spur-gears $b'$, and the conveyer-shafts $f$ with similar but smaller wheels, $b''$, the whole system of wheels being driven from the pulley $d$ and by the engagement of the said wheels with each other. The conveyer-boxes are represented by F, consisting of inclined sides and the bottom receptacles in which the conveyers revolve, running from the partition $c$ to the other end of the machine. Below the lower conveyer are a series of valves, $g$, which are used when different sections in the lengths of the lower reel are covered with bolting-cloth of different mesh, the valves when opened allowing flour of different grades of fineness to be removed from the machine.

The operation of the machine is as follows: The first or upper reel takes all the offal, together with the flour, from the pipe $h$, the flour being sifted, during the revolution of the reel, into the conveyer-box next below, the bolting-cloth of the first reel being coarser than that of the succeeding reels. The middlings or coarser particles, if the first valve $e$ in the first spout is placed as shown in the drawing, Fig. 2, are allowed to fall to the next chute, or, if the valve is closed as shown in the second spout, the middlings are allowed to pass separately from its reel without mixture with the offal from the second reel. The flour, falling into the upper conveyer-box, is carried by its screw-conveyer to the other end of the machine to the pipe $h'$, admitting the flour to the second reel, which is provided with finer bolting-cloth. The operation is continued, the finer flour falling to the next lower conveyer-box, and being conveyed to the pipe $h''$, the middlings either spouted off separately or allowed by the opening of the second valve $e$ to fall to the lowest spout E. The operation with the next or lowest reel and conveyer is the same, the flour entering the reel through the pipe $h''$, and, after the sifting, being conveyed to the pipe or opening $h'''$, whence it leaves the machine.

The lowest reel may have in its length cloths of different mesh, and the different grades of flour can be spouted off on falling to the conveyer-box by the use of the valves $g$ when properly regulated. To promote ventilation and keep the flour cool during the process of bolting, the side panels $k$ of the machine are open and covered with cloth, as shown in Fig. 3. The panels are hinged, to allow of convenient access to the interior of the machine.

In erecting this invention for use in flouring-mills, I design to place two of the machines together, either in contact at one side or sufficiently apart to allow ingress between them. In either case the machines would be run by the same counter and driving shafts, the gearing of the two machines either engaging directly or through the intervention of idlers.

This invention is applicable to the use of millers employing grinding-mills of any character; and it is well adapted for use in connection with my improved duplex mill for grinding, described in my Letters Patent No. 188,783, dated March 27, A. D. 1877.

Having thus described my invention, what I claim as new, and wish to secure by Letters Patent of the United States, is—

1. A series of bolting-reels and screw-conveyers, combined with a system of inclined bottoms or chutes, provided with valves $e$ and spouts, whereby the middlings or offal from each reel may be carried from the machine separately, or may be spouted off collectively from all the reels at the end of the machine, substantially in the manner and for the purposes herein specified.

2. In a bolting-machine, the partition $c$, perforated for the ends of the reels, combined with inclined bottoms or chutes D, provided with spouts $E'$ and valves $e$, substantially as specified.

In testimony that I claim the foregoing as my invention I hereto subscribe my name this 21st day of March, A. D. 1877.

JOHN S. DETWILER.

Witnesses:
  JOHN B. FONTAINE,
  GEORGE H. HOWARD.